United States Patent
De Lamberterie et al.

(10) Patent No.: US 10,557,613 B2
(45) Date of Patent: Feb. 11, 2020

(54) LIGHT GUIDE WITH MEANS TO COMPENSATE FOR GRADUAL LOSSES OF LIGHT ALONG THE GUIDE

(71) Applicant: VALEO VISION, Bobigny (FR)

(72) Inventors: Antoine De Lamberterie, Paris (FR); Christophe Valois, Hasnon (FR)

(73) Assignee: VALEO VISION, Bobigny (FR)

( * ) Notice: Subject to any disclaimer, the term of this patent is extended or adjusted under 35 U.S.C. 154(b) by 88 days.

(21) Appl. No.: 15/548,894

(22) PCT Filed: Feb. 5, 2016

(86) PCT No.: PCT/EP2016/052560
§ 371 (c)(1),
(2) Date: Aug. 4, 2017

(87) PCT Pub. No.: WO2016/124770
PCT Pub. Date: Aug. 11, 2016

(65) Prior Publication Data
US 2018/0031204 A1  Feb. 1, 2018

(30) Foreign Application Priority Data
Feb. 5, 2015 (FR) ..................... 15 50920

(51) Int. Cl.
*F21S 43/237* (2018.01)
*F21V 8/00* (2006.01)
(Continued)

(52) U.S. Cl.
CPC .......... *F21S 43/237* (2018.01); *B60Q 1/0011* (2013.01); *F21S 41/24* (2018.01);
(Continued)

(58) Field of Classification Search
CPC ...... F21S 43/237; F21S 43/245; F21S 43/247; F21S 43/249; F21S 41/24; G02B 6/0036; G02B 6/0038
See application file for complete search history.

(56) References Cited

U.S. PATENT DOCUMENTS

| 2004/0095743 A1* | 5/2004 | Yu ........................ | G02B 6/0036 362/613 |
| 2010/0124076 A1* | 5/2010 | Kurihara .............. | G02B 6/0036 362/607 |

(Continued)

FOREIGN PATENT DOCUMENTS

| DE | 10055561 A1 | 5/2002 |
| EP | 0935091 A1 | 8/1999 |

(Continued)

OTHER PUBLICATIONS

International Search Report dated Apr. 20, 2016, in PCT/EP2016/052560, filed Feb. 5, 2016.
(Continued)

Primary Examiner — Sean P Gramling
(74) Attorney, Agent, or Firm — Oblon, McClelland, Maier & Neustadt, L.L.P.

(57) ABSTRACT

A light guide including a transparent body which is generally elongated in a principal direction with an outer facet forming a diopter with the environment of the body, a first row of inclined facets adapted to reflect the rays in order for them to exit, and at least one second row of reflecting facets of smaller size than the corresponding reflecting facets of the first row. The light reflected by the second row or rows is added to the light beam coming from the first row. The widths of the first row and the second rows can respectively and progressively increase and decrease from the light source so as to compensate the progressive losses of light traveling in the light guide.

20 Claims, 2 Drawing Sheets

(51) Int. Cl.
  *F21S 43/245* (2018.01)
  *F21S 43/249* (2018.01)
  *F21S 43/247* (2018.01)
  *F21S 41/24* (2018.01)
  *F21S 41/32* (2018.01)
  *F21S 43/241* (2018.01)
  *B60Q 1/00* (2006.01)
  *F21S 41/20* (2018.01)
  *F21S 43/20* (2018.01)

(52) U.S. Cl.
  CPC ........... *F21S 41/322* (2018.01); *F21S 43/241* (2018.01); *F21S 43/245* (2018.01); *F21S 43/247* (2018.01); *F21S 43/249* (2018.01); *G02B 6/001* (2013.01); *G02B 6/0036* (2013.01); *F21S 41/28* (2018.01); *F21S 43/26* (2018.01)

(56) References Cited

U.S. PATENT DOCUMENTS

2011/0044059 A1   2/2011   Inoue et al.
2015/0098118 A1*  4/2015   Shiue ................. H04N 1/02895
                                                         358/475

FOREIGN PATENT DOCUMENTS

EP         1780463 A1    5/2007
FR         2871550 A1   12/2005

OTHER PUBLICATIONS

French Search Report dated Nov. 24, 2015 in French Patent Application No. 1550920, filed Feb. 5, 2015.

\* cited by examiner

LIGHT GUIDE WITH MEANS TO COMPENSATE FOR GRADUAL LOSSES OF LIGHT ALONG THE GUIDE

The invention relates to the field of light guides, notably for motor vehicle lighting and/or signaling modules and devices.

The patent document FR 2 871 550 A1 discloses a light guide for motor vehicle lighting or signaling devices, the guide including a transparent body that is generally elongate in a principal direction with an outer surface forming with the environment of said body a diopter and reflecting facets distributed along the exterior surface. The reflecting facets have a prismatic profile so as to deviate light rays passing through the guide by successive reflection at the diopter. This deviation enables the rays in question to encounter the diopter with an angle of incidence less than the total reflection limit angle and therefore to exit the body of the guide. The prismatic reflecting facets have a profile that varies along the guide so as to compensate at least in part the progressive loss of light essentially linked to their progressive exit. To this end, the prismatic profile may have a variable height and/or spacing. The adjacent prismatic facets can in effect be at a distance from one another, this distance then being able to decrease along the guide from the light source. The prismatic facets can have a variable height, that height increasing along the guide from the light source. The solution for compensating losses disclosed in this teaching is interesting. However, it has the disadvantage that it is liable to form an irregular image given the variation of the pitch and/or of the height of the prismatic facets along the guide. Consequently, the compensation made possible by this solution is limited if there is a requirement to limit the effect of irregularity on the image produced.

Patent document EP 1 780 463 A1 also discloses a light guide for a lighting or signaling device for a motor vehicle. In a similar manner to the foregoing teaching, the transparent body of the guide includes reflecting facets intended to cause rays to exit the guide along the latter. The reflecting facets have a pseudo-prismatic profile, i.e. they are curved and/or form a break so as to have different inclinations. The objective of this measure is to improve the homogeneity of the luminous flux for viewing angles departing from the principal viewing angle, i.e. viewing angles departing from the longitudinal axis of the vehicle.

The patent document EP 0 935 091 A1 also discloses a light guide for a lighting and/or signaling device for motor vehicles. In a similar manner to the foregoing teachings, it includes reflecting facets distributed along its outer surface, those facets having a prismatic profile so as to divert light rays traveling along the guide by successive reflection at the diopter. In a similar manner to the first teaching mentioned above, it provides measures for compensating the progressive loss of light along the guide. Those measures essentially consist in varying the width of the prismatic facets along the guide, more particularly to increase it progressively as the distance from the entry face of the guide illuminated by a light source increases. However, these measures have the drawback that the portions of the prismatic facets of reduced width produce a very narrow beam. In other words, the beam is highly non-homogeneous for viewing angles departing from the main viewing angle, i.e. viewing angles departing from the longitudinal axis of the vehicle.

An objective of the invention is to propose a light guide alleviating at least one of the disadvantages mentioned above. The invention more particularly has the objective of proposing a light guide able to produce as homogeneous as possible a light beam, even more particularly able to produce a light beam the homogeneity of which in the direction of the guide and transversely to the guide is improved.

The invention consists in a light guide including a transparent body which is generally elongate in a principal direction with an outer surface forming a diopter with the environment of said body; ray exit means extending along the outer surface of the body adapted to cause light rays propagating in the body to exit it transversely; noteworthy in that the ray exit means include a first row of means disposed consecutively and at least one second row of means disposed consecutively, the distance separating two consecutive means of the first and/or the second row or rows being variable along said row or rows.

By "means disposed consecutively" is meant that the means in question are disposed in a consecutive manner along the outer surface of the guide.

The means of the first and/or the second row or rows are advantageously inclined reflecting facets able to reflect the rays in order for them to exit. The reflecting facets of the second row or rows are advantageously of smaller size than the corresponding reflecting facets of the first row, i.e. the adjacent facets of the first row.

The first row and the second row or rows are preferably parallel and side by side.

The second row or rows is/are adjacent the first row in a transverse direction.

The angle of inclination of the reflecting facets of the first row and/or of the second row or rows is preferably constant. However it can vary along the body of the guide. Likewise the size of these facets.

According to one advantageous embodiment of the invention, the ray exit means are prisms each formed of a reflecting facet and a connecting facet, the reflecting and connecting facets of each prism being joined by one of their edges.

The prisms can have a V-shaped profile so that one of the facets of the prism, in this instance the reflecting facet, is able to reflect the rays reaching it by total reflection transversely to the principal direction of the guide. The reflecting facets can be plane, convex or concave.

According to one advantageous embodiment of the invention, the first row includes connecting facets between the inclined facets so as to form prisms and said connecting facets of the first row preferably form with respective perpendiculars to the principal direction of the body and passing through said facets an angle less than 30°, more preferably less than 20°, even more preferably less than 10°. A connecting facet connects two consecutive inclined facets.

The profile of the reflecting facets and the connecting facets is such that these facets form prismatic volumes.

According to an advantageous embodiment of the invention, the connecting facets are adjacent the respective reflecting facets.

According to an advantageous embodiment of the invention, the distance separating two consecutive means of the first row is zero and the distance separating two consecutive means of the second row or rows is variable along said row or rows.

According to an advantageous embodiment of the invention, the distance separating two consecutive means of the second row or rows is zero and the distance separating two consecutive means of the first row is variable along said row.

According to an advantageous embodiment of the invention, the distance separating two consecutive means of the first row is variable along said row and the distance separating two consecutive means of the second row or rows is variable along said row or rows.

According to an advantageous embodiment of the invention, the reflecting facets of the second row or of at least one second row are inclined facets the length l of which is less than the length L of the corresponding inclined facets of the first row, the length l preferably being less than 30% of the length L, more preferably 50%, even more preferably 70%.

According to an advantageous embodiment of the invention, the inclined facets of the second row or rows are aligned with the corresponding inclined facets of the first row.

According to an advantageous embodiment of the invention, the second row or rows include respective first and second connecting facets between the inclined facets, the first facets being generally parallel to the principal direction of the body and the second facets forming with respective perpendiculars to the principal direction of the body and passing through said facets an angle less than 30°, more preferably less than 20°, even more preferably less than 10°. The first connection sources corresponding to a clipping or truncation of prismatic volumes formed by pairs of inclined facets and second connecting facets that are consecutive.

According to an advantageous embodiment of the invention, the second connecting facets of the second row or rows are aligned with the respective connecting facets of the first row.

According to an advantageous embodiment of the invention, the second connecting facets of the second row or rows have a height h less than the height H of the corresponding connecting facets of the first row, the height h preferably being less than 30% of the height H, more preferably 50%, even more preferably 70%.

According to an advantageous embodiment of the invention, the width of the first row and/or of the second row or rows varies along the principal direction of the body.

According to an advantageous embodiment of the invention, the width of the first row decreases and the width of the or at least one second row increases in a given sense along the principal direction of the body.

According to an advantageous embodiment of the invention, the width of the first row decreases and the width of the or at least one second row increases in a given sense along a first portion of the body and conversely along a second portion (and in the same sense), said second portion preferably being adjacent the first.

According to an advantageous embodiment of the invention, the reflecting facets of the second row or rows are less than 70%, preferably 50%, even more preferably 30% of the corresponding reflecting facets of the first row.

According to an advantageous embodiment of the invention, the guide includes two second rows disposed on respective opposite sides of the first row.

According to an advantageous embodiment of the invention, the cumulative width of the first row or of the second row or rows is essentially constant, preferably over more than 50%, more preferably 70%, even more preferably 90% of their length.

According to an advantageous embodiment of the invention, the reflecting facets of the second row or rows are diffusing rough facets.

The invention also consists in a lighting and/or signaling module including a light guide and at least one light source, remarkable in that the light guide is in accordance with the invention.

According to an advantageous embodiment of the invention, the module includes at least one light source at each of the ends of the light guide.

The invention also consists in a lighting and/or signaling device including a housing and a lighting and/or signaling module, noteworthy in that the module is in accordance with the invention.

The measures of the invention are advantageous in that they make it possible to generate a homogeneous light beam along the principal direction of the light guide and also transversely, preferably perpendicularly, to that direction. Essentially, the first row can be configured to compensate progressively the losses of light along the guide and thus to ensure homogeneity along the principal direction of the guide. The second row or rows make it possible to complete the light beam in a direction transverse to the principal direction. The second row or rows can also contribute to the homogeneity in the principal direction.

Other features and advantages of the present invention will be better understood with the aid of the description and the drawings, in which.

Figure 1:
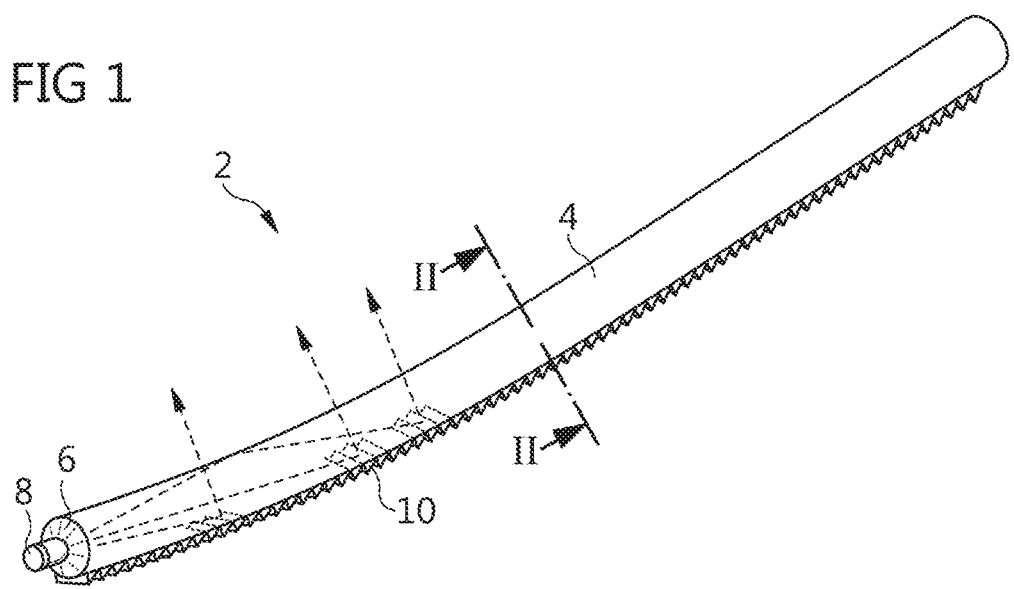
FIG. 1 is an illustration of a light guide according to the invention.

FIG. 1 shows a guide light according to the invention. The light guide 2 includes a transparent body 4 extending in a principal direction. It can extend in a straight line, a curve or a combination of the two. Its section can take various shapes, such as a circular, oval or polygonal shape, for example. The transparent body 4 can be made of glass or a plastic material such as polycarbonate or PMMA in particular. It has an entry face 6 at one of its two ends, facing which are disposed one or more light sources 8. The light rays emitted by the light sources 8 enter the transparent material 4 of the light guide to propagate therein by transmission and successive reflections at the diopter formed by the outer surface of the body and the surrounding air. In fact, the transparent material body has a refractive index higher than that of the surrounding air, typically of the order of 1.5 whereas that of air is 1. The light rays such as those represented by dashed lines in FIG. 1 encounter the diopter with angles of incidence greater than the maximum refraction angle (known from the Snell-Descartes law). These rays are then reflected successively and propagate in the body 4 essentially in the principal direction.

The transparent body 4 has inclined reflecting facets 10 on a portion of its outer surface. That portion may correspond to a fraction of the periphery of the body, such as less than one quarter, for example, or less than one fifth of the periphery. It can extend over the whole or most of the length of the body or alternately over only a small part of the body, notably depending on the application envisaged. These reflecting facets 10 enable the rays to be deflected in directions transverse to the main axis of the guide and thus to cause them to exit the guide, thus generating a light beam.

The rays forming the light beam exit the body of the guide via a portion of the body essentially opposite the portion including the reflecting facets 10. This portion is usually termed the exit face, the portion including the reflecting facets usually being termed the reflecting face.

Figure 2:
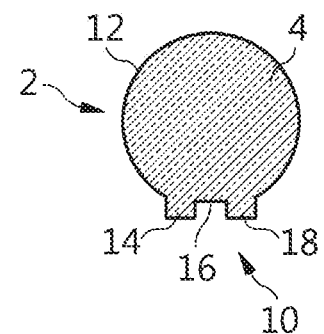
FIG. 2 is a view in section taken along the line II-II in FIG. 1.

FIG. 2 shows in more detail the reflecting facets 10 intended to cause the light rays to exit the body of the guide. This is a view in section of the guide taken along the line II-II in FIG. 1. There can be identified in it the outer surface 12 of the body 4 of the guide 2 forming the diopter. It can also be seen that the reflecting facets portion 10 comprises three zones: a central first zone 16 and two lateral zones 14 and 18 on respective opposite sides of the central zone. The central zone 16 constitutes a first row of inclined reflecting facets and the lateral zones 14 and 18 constitute second rows of reflecting facets of smaller size than those of the first row, as described in more detail hereinafter with reference to FIG. 3.

Figure 3:
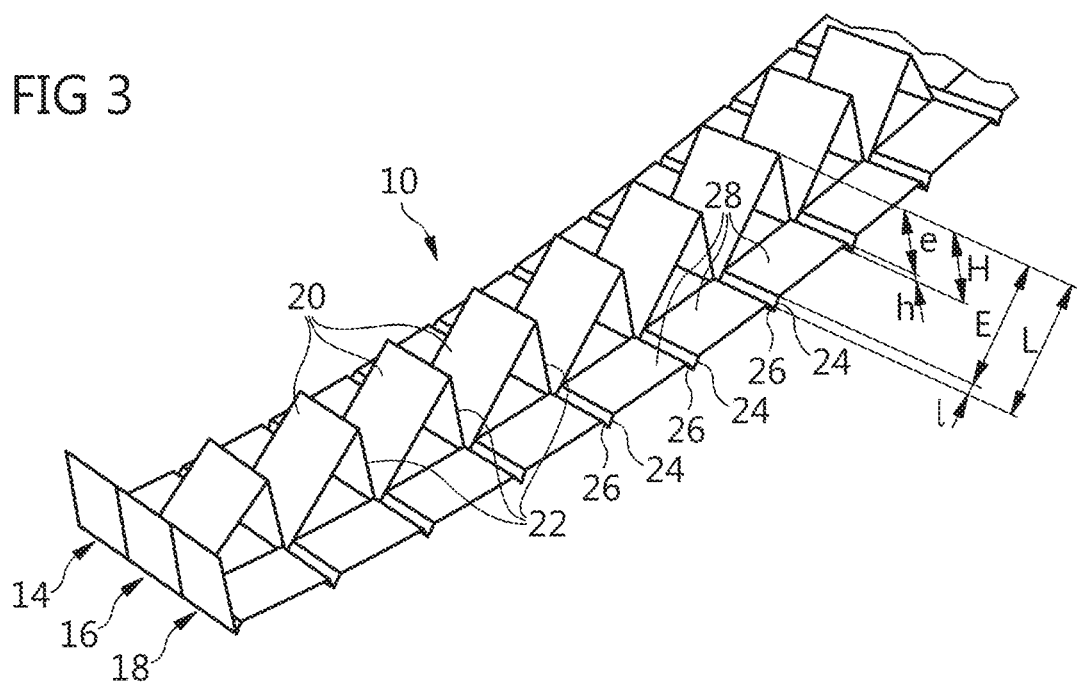
FIG. 3 is a detail view of the rows of reflecting facets of the light guide from FIGS. 1 and 2.

FIG. 3 is a view to a larger scale of the reflecting facets 10 of the guide from FIGS. 1 and 2. It is a view through the body of the guide, as if transparent, the material of the body being present above the relief shown and the surrounding air being present below said relief.

The central row 16 corresponds to a first row of reflecting facets with the prismatic profile. To be more precise, the first row 16 includes inclined reflecting facets 20 and connecting facets 22, a connecting facet connecting two adjacent inclined facets. Each pair comprising an inclined facet 20 and adjacent connecting facet 22 forms a prismatic volume. The inclined facets 20 can all have substantially the same angle of inclination. The connecting facets 22 are close to perpendicular to the principal direction of the body. They form with respective perpendiculars to the principal direction of the body and passing through said facets an angle less than 30°, more preferably less than 20°, even more preferably less than 10°.

The rays propagating through the material of the body of the guide and encountering one of the inclined facets 20 can then be reflected transversely toward the exit face of the body, opposite the face with the reflecting facets 10.

The lateral rows 14 and 18 correspond to second rows of reflecting facets. Here these are also inclined facets 24, similar to the inclined facets 20 of the first row. However, these inclined facets 24 are of substantially smaller size than those of the first row 16. They can be aligned with the inclined facets of the first row, as can be seen in FIG. 3. The second rows also include connecting facets between the inclined facets 24. They include first connecting facets 28 extending essentially in the principal direction of the guide and second connecting facets 26 extending in a direction close to perpendicular to the principal direction of the guide, in a similar way to the connecting facets 22 of the first row 16. In a similar way to the inclined facets of the first and second rows, the second connecting facets 26 of the second row or rows can be aligned with the connecting facets 22 of the first row. Each pair of inclined facets 24 is connected by a first connecting facet 28 and a second connecting facet 26. In other words, the first connecting facet 28 corresponds to truncation of the prism formed by an inclined facet 24 and a second connecting facet 26 connected to the inclined facet by the first connecting facet 28. Consequently the second row or rows include(s) inclined facets corresponding to prisms the apex of which is truncated.

In a similar way to the phenomenon of reflection at the inclined facets of the first row, the rays propagating through the material of the body of the guide and encountering one of the inclined facets 24 can then be reflected transversely toward the exit face of the body, opposite the face with the reflecting facets 10.

The inclined facets 20 of the first row 16 lave a length L greater than the length l of the inclined facets of the second row or rows 14 and 18. The lengths L and l of the inclined facets are as measured in a direction in a plane containing the principal direction. The length l can be less than 30%, preferably 50%, more preferably 70% of the length L.

The connecting facets 22 of the first row 16 have a height H greater than the height h of the second connecting facets 26 of the second row or rows 14 and 18. The heights H and h of the connecting facets are as measured in a direction in a plane containing the principal direction. The height h can be less than 30% of the height H, preferably 50%, more preferably 70%.

The first connecting facets 28 of the second row or rows 14 and 18 are commensurately longer than the inclined facets and the second connecting facets of the second row or rows are less than those of the first row 16.

In practice the arrangement of the reflecting facets 10 as shown in detail in FIG. 3 has the effect that the inclined facets 24 of the second rows 14 and 18 reflect less luminous flux than those of the first row 16. They nevertheless make it possible to complete the light beam, notably in areas departing from its principal direction.

The width of the first row 16 can vary along the guide, in particular increase in the direction away from the entry face and the light source or sources. In this case the reflecting inclined facets 20 progressively increase in width and therefore in area. This makes it possible to compensate the progressive reduction of the luminous flux propagating along the guide linked to the exit of some of the rays in order to form the beam. The width of the second row or rows can also vary along the guide. It can vary in the opposite direction to that of the first row, i.e. it can decrease as the width of the first row increases. In fact, the increase in the width of the first row makes it possible to generate a beam the homogeneity of which in a direction perpendicular to the principal direction of the guide is improved, i.e. in observation directions departing from the principal direction of the beam. The need to complete the beam with the second row or rows then becomes less important. Alternatively, the width of the second row or rows can remain constant while the width of the first row varies.

Figure 4:
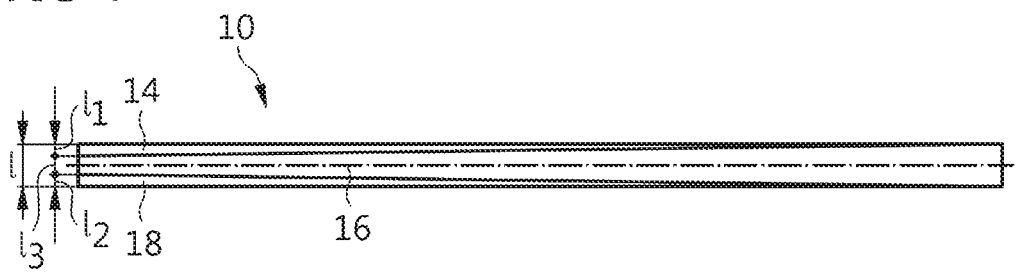
FIG. 4 is a view in elevation of the light guide from FIGS. 1 to 3 diagrammatically illustrating the rows of reflecting facets.

FIG. 4 is a view in elevation of the face of the reflecting facets 10 of the guide from FIGS. 1 to 3 diagrammatically showing the evolution of the respective widths of the first and second rows 16 and 14/18. The left-hand end corresponds to the entry face 6 (FIG. 1) of the guide and the light source or sources. It can be seen that the first row 16 has a width $I_3$ and that the second rows have respective widths $I_1$ and $I_2$. The width $I_3$ of the first row 16 progressively increases from the left-hand end corresponding to the entry of light up to the opposite end. The widths $I_1$ and $I_2$ of the second rows 14 and 18 can be equal and decrease respectively pro rata the increase in the width $I_1$ of the first row 16, the cumulative width I remaining essentially constant. This therefore makes it possible to compensate the progressive exit of rays by the increase in the size of the prismatic reflecting facets of the first row. The completing of the light beam by the second rows can then be progressively reduced given this increase in the size of the prismatic reflecting facets of the first row.

Figure 5:
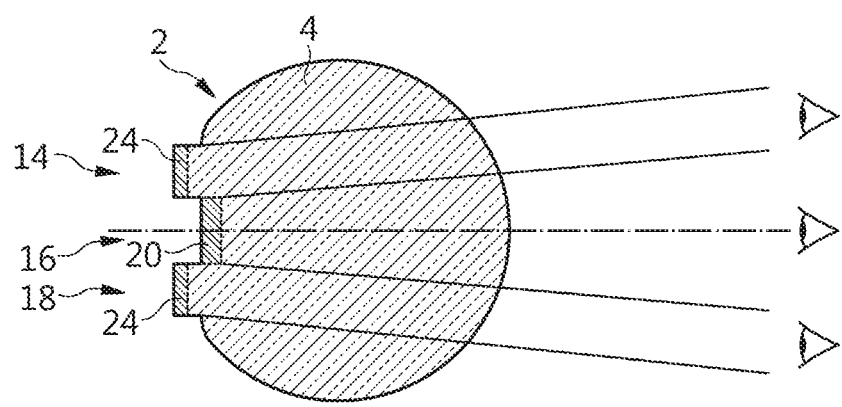
FIG. 5 is a sectional view of the guide from FIGS. 1 to 4 illustrating the impact of the various rows of reflecting facets on the light beam produced.

FIG. 5 is a view in cross section of the body 4 of the light guide 2 from FIGS. 1 to 4. It shows the production of the light beam by the first and second rows 16 and 14/18, respectively. It can in fact be seen that the inclined reflecting facets 20 of the first row 16 essentially generate the central part of the light beam, centered on the optical axis of the lighting device. It can also be seen that the inclined reflecting facets 24 of the second rows 14 and 18, being of smaller size, complete the beam, notably in areas to the side of the optical axis.

The first row 16 therefore makes it possible to generate a central part of the beam that is homogeneous along the guide by compensating by the variation in size of the inclined facets the progressive loss of luminous flux along the guide. The second row or rows make it possible to complete the beam, in particular in areas that are distant from the optical axis of the light guide and its module and associated device. This is especially true for the portions of the guide in which the reflecting facets of the first row are the smallest, more particularly where they are the narrowest.

It should be noted that depending on the application concerned a single second row may be sufficient. The presence of two or more second rows on either side of the first row makes it possible to complete the beam on two opposite sides.

It should also be noted that the second row or rows can be rough diffusing facets. They can then comprise a large number of small reflecting facets oriented randomly in directions mostly normal to the rough facet. The light traveling through the guide and encountering the rough facet or facets is reflected in a great number of directions of which the normal to the corresponding rough facet portion is the main component and the energy of the incident ray is redistributed in a multitude of reflected rays. This is diffuse reflection able to complete the light beam produced by the first row. The average size of the small rough reflecting facets of a row can be less than 1 mm, preferably 0.5 mm, more preferably 0.2 mm.

Figure 6:
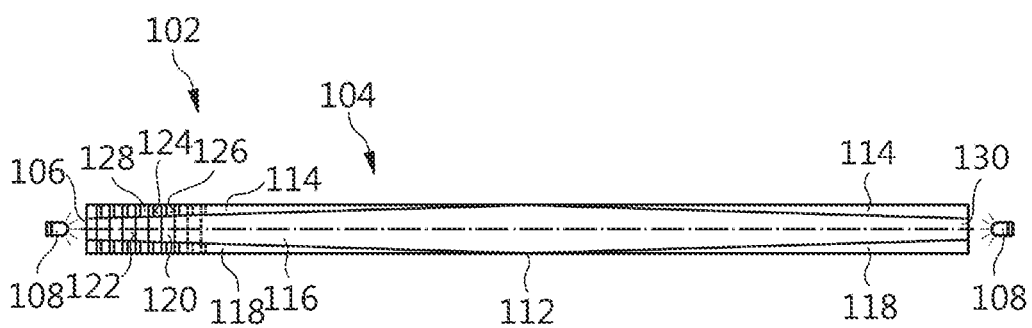
FIG. 6 is a view in elevation of a light guide according to a second embodiment diagrammatically illustrating the rows of reflecting facets.

FIG. 6 is a view in elevation of the face of the reflecting facets of a light guide according to a variant of the guide from FIGS. 1 to 5. The reference numbers for the guide from FIGS. 1 to 5 are used here for identical or corresponding elements, these numbers being nevertheless increased by 100 in order to distinguish clearly the two embodiments. FIG. 6 shows diagrammatically the evolution of the respective widths of the first and second rows 116 and 114/118 of the guide 102, everything else possibly being the same as in the guide from FIGS. 1 to 5. It can be seen that the body 104 of the guide 102 includes two entry faces 106 and 130 at its two ends.

The first row 116 of reflecting facets has a reduced width at the level of each of the two entry faces, this width progressively increasing from the entry faces toward a central portion of the guide. The second rows 114 and 118 on either side of the first row 116 vary in width in the opposite direction, preferably so that there is an essentially constant overall width.

Other embodiments can be envisaged, notably with regard to the variations in size of the reflecting facets of the first and second rows.

The invention claimed is:

1. A light guide comprising:
   a transparent body which is generally elongate in a principal direction with an outer surface forming a diopter with the environment of said body; and
   ray exit means extending along the outer surface of the body adapted to cause light rays propagating in the body to exit it transversely;
   wherein the ray exit means include:
   (i) a first row of means disposed consecutively, and
   (ii) a second row of means disposed consecutively and adjacent to the first row of means, and
   (iii) a third row of means disposed consecutively and adjacent to the first row of means on an opposite side of the first row of means with respect to the second row of means, the distance separating two consecutive means of the first, the second row, and/or the third row being variable along said row or rows, the first row of means, the second row of means, and the third row of means including inclined reflecting facets configured to reflect light towards an exit side, the reflecting facets of the second row of means and the reflecting facets of the third row of means having a height smaller than the reflecting facets of the first row of means.

2. The light guide according to claim 1, wherein the ray exit means are prisms each formed of a reflecting facet and a connecting facet, the reflecting and connecting facets of each prism being joined by one of their edges.

3. The light guide according to claim 2, wherein the connecting facets of the first row form with perpendiculars to the principal direction of the body passing through said facets an angle less than 30°.

4. The light guide according to claim 1, wherein the distance separating two consecutive means of the first row is zero and the distance separating two consecutive means of the second row or third row is variable along said second row or third row.

5. The light guide according to claim 1, wherein the distance separating two consecutive means of the second row or third row is zero and the distance separating two consecutive means of the first row is variable along said first row.

6. The light guide according to claim 1, wherein the distance separating two consecutive means of the first row is variable along said row and the distance separating two consecutive means of the second row or third row is variable along said second row or third row.

7. The light guide according to claim 2, wherein the reflecting facets of the second row or the third row are inclined facets having a length L1 that is less than a length L2 of the corresponding inclined facets of the first row, the length L1 being less than 70% of the length L2.

8. The light guide according to claim 7, wherein the inclined facets of the second row or third row are aligned with the corresponding inclined facets of the first row.

9. The light guide according to claim 7, wherein the second row or third row include respective first and second connecting facets between the inclined facets, the first facets being generally parallel to the principal direction of the body and the second facets forming with respective perpendiculars to the principal direction of the body and passing through said facets an angle less than 30.

10. The light guide according to claim 3, wherein the second connecting facets of the second row or third row are aligned with the respective connecting facets of the first row.

11. The light guide according to claim 3, wherein the second connecting facets of the second row or third row have a height H1 less than a height H2 of the corresponding connecting facets of the first row, the height H1 being less than 70% of the height of H2.

12. The light guide according to claim 1, wherein width of the first row, the second row, or the third row varies along the principal direction of the body.

13. The light guide according to claim 1, wherein width of the first row decreases and the width of the second row or third row increases along the principal direction of the body.

14. The light guide according to claim 1, wherein the width of the first row decreases and the width of the second row or third row increases along first and second adjacent portions of the body.

15. A lighting and/or signaling module including a light guide and at least one light source, wherein the light guide is according to claim 1.

16. The module according to claim 15, wherein the module includes at least one light source at each of the ends of the light guide.

17. A lighting and/or signaling device including a housing and a lighting and/or signaling module, wherein the module is as claimed according to claim 15.

18. The light guide according to claim 2, wherein the distance separating two consecutive means of the first row is zero and the distance separating two consecutive means of the second row or third row is variable along said row or third row.

19. The light guide according to claim 2, wherein the distance separating two consecutive means of the second row or third row is zero and the distance separating two consecutive means of the first row is variable along said first row.

20. The light guide according to claim 2, wherein the distance separating two consecutive means of the first row is variable along said row and the distance separating two consecutive means of the second row or third row is variable along said row or third row.

* * * * *